United States Patent [19]

Kenmochi et al.

[11] Patent Number: 4,519,761

[45] Date of Patent: May 28, 1985

[54] COMBINED MOLDING AND ASSEMBLING APPARATUS

[75] Inventors: Kazuei Kenmochi, Hirakata; Tadashi Sakairi, Katano; Yoshio Maruyama, Kyoto; Eizi Itemadani, Sakai, all of Japan

[73] Assignee: Matsushita Electric Industrial Co., Ltd., Kadoma, Japan

[21] Appl. No.: 647,825

[22] Filed: Sep. 5, 1984

[30] Foreign Application Priority Data

Sep. 8, 1983 [JP] Japan .................. 58-165543

[51] Int. Cl.$^3$ .................. B29C 1/00; B29D 3/00
[52] U.S. Cl. .................. 425/135; 425/317; 425/542; 29/703; 29/709; 29/720; 29/799
[58] Field of Search .................. 425/88, 135, 161, 317, 425/542, 17; 29/703, 709, 712, 720

[56] References Cited

U.S. PATENT DOCUMENTS

| | | | |
|---|---|---|---|
| 3,067,457 | 12/1962 | Dennis et al. | 425/17 |
| 3,739,050 | 6/1973 | Koncz et al. | 425/88 X |
| 3,824,058 | 7/1974 | Axer et al. | 425/317 X |
| 3,964,847 | 6/1976 | Redmer et al. | 425/317 X |
| 4,100,667 | 7/1978 | Napor et al. | 29/703 X |
| 4,276,318 | 6/1981 | Orlowski et al. | 425/135 X |
| 4,293,292 | 10/1981 | Isreal | 425/135 X |
| 4,464,833 | 8/1984 | Duncan | 29/709 X |

FOREIGN PATENT DOCUMENTS 57-8047  1/1982  Japan .................. 29/703

Primary Examiner—J. Howard Flint, Jr.
Attorney, Agent, or Firm—Wenderoth, Lind & Ponack

[57] ABSTRACT

A combined molding and assembling apparatus which comprises a conveyor movable from one position to another position spaced apart from such one position, a pallet frictionally engageable with the conveyor for movement together therewith, a catch mechanism releaseably engageable with the pallet to hold the pallet at a working position, a molding machine fixedly mounted on a bench of the apparatus adjacent the conveyor and including a movable plate movable in a direction perpendicular to the direction of movement of the conveyor means for selectively closing and opening a mold assembly, and a handling machine including a head capable of moving selectively into and away from the space, in which the mold assembly operates, during the opening of the mold assembly.

6 Claims, 7 Drawing Figures

COMBINED MOLDING AND ASSEMBLING APPARATUS

BACKGROUND OF THE INVENTION

The present invention relates to a combined molding and assembling apparatus used for the production of products utilizing resin molded articles.

According to a conventional practice to make a product utilizing a resin molded article, it is a long-standing way to manufacture a planned number of resin molded articles which are, after having been allowed to stand for a certain period of time, transferred to an assembling site for the fabrication into products. This is rather a universal method because of the following reasons:

(A) The resin molded article is susceptible to shrinkage after the molding and, therefore, it is an accepted policy to allow the resin molded article to stand for more than 24 hours for aging.

(B) The supply of the resin molded article to the assembling site after it has been examined as to the dimension requirement should not be done before the passage of more than 24 hours.

(C) While the molding machine is usually run day and night, continuously repeating a cycle of molding operation in a predetermined sequence, the assembling work requires the intervention of manual labors and, therefore, tends to take a different time from one assembling site to another by some reason particularly where the assembling sites are lined up to permit a product to be sequentially fabricated. In addition, the working hour during which assembling workers have to do their job is limited to 7 to hours excluding the lunch time.

(D) Since the molding machine has numerous drives usually comprised of hydraulic cylinders and associated hydraulic circuits, the molding machine tends to be easily contaminated with oil stains and is, therefore, desired not to be used in a clear working area.

(E) Since the molding machine is relatively bulky in size, it will bring about a problem with the layout of the apparatus as a whole where the assembling job is to be performed on a linear conveyor system.

However, with the recent change in production situation, it has now become considered disadvantageous to perform the molding and the assembly at separate sites spaced a considerable distance from each other. More specifically, the recent change in production situation is such that the age of limited production of a diversity of planned design of products has superseded the age of mass production of a single planned design of products and that both the increase in wage as a result of the improved mode of life and the improvement in production technology has made the direct cost, incurred in processing and assembling, approach the balance in cost indirectly incurred in a workshop.

The change in production situation has in turn brought about the following problems:

(i) Since the parts are diversified in design, the stockpile is increased.

(ii) The increased stockpile has increased the importance of stock control, the necessity of quality control, the necessity of sorting procedure, the necessity of assembling rehearsal, and the weight of other non-mechanized jobs, constituting a cause of the increased manufacturing cost combined with increased personnel expenses.

(iii) While the mold assembly of the molding machine has been provided with a capability of making a plurality of molded articles in each cycle of operation of the machine, the number of molded articles to be made using the same mold assembly is decreased because of the decrease in production per lot and also because of the decrease in stockpile of semi-manufactured products, and the increase in frequency of replacement of the mold assembly as well as material has become observed. Therefore, the machine has no longer been able to exhibit its performance.

Because of the reasons stated above, the adequacy to carry out the molding and the assembly at spaced apart sites has come to lack its foundation.

In addition thereto, the prior art assembling conveyor system has the following problems. Before the problems are discussed, the structure of the prior art assembling conveyor system will be described with reference to FIG. 1 of the accompanying drawings.

Figure 1:
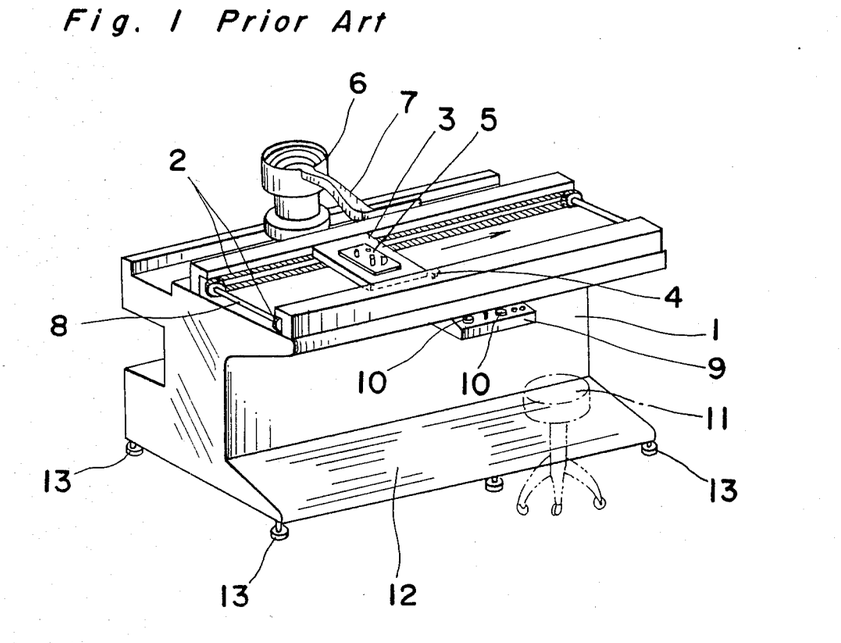
FIG. 1 is a perspective view of the prior art assembling conveyor apparatus.

The assembling conveyor system shown in FIG. 1 is used on a production line for fabricating mechanisms of an electric appliance such as an audio tape recorder or a video tape recorder. The system comprises a bench 1 having a foot rest 12, a chain conveyor 2 having its upper run movable in a direction shown by the arrow, a pallet 3 movable together with the conveyor 2, a pawl 4 of a catch mechanism for causing the pallet 3 to slip relative to the conveyor 2, a work 5 positioned on the pallet and onto which a resin component is to be fabricated, a parts feeder 6 for successively supplying resin components while imparting a vibration thereto, an alignment chute 7 for aligning the resin components, which have been supplied from the parts feeder, in a row within the reach of an attendant worker who would be sitting on a chair or stool 11 shown by the phantom line, a drive shaft 8 for transmitting a drive from a motor (not shown) to the chain conveyor 2, a control box 9 having a plurality of operating buttons 10, and levelling jacks 13 through which the bench 1 is installed on a floor or ground surface.

If a plurality of the systems of the above described construction are lined up, the pallet will move one system to the next adjacent system, travelling from one end to the opposite end of the assembly line. The pallet so moved can be brought to a halt at a working site occupied by the attendant worker at which time the pawl 4 of the catch mechanism has projected into a space, in which the pallet moves, for engagement with the pallet allowing the latter to slip relative to the conveyor 2. Then, the attendant worker picks up a resin component out from the alignment chute 7 and fabricates it onto the work 5 resting on the pallet 3. When a switch on the control box 10 is thereafter operated, the pawl 4 of the catch mechanism is temporarily retracted to release the pallet 3, allowing the latter to be transported by the conveyor 2 in the direction indicated by the arrow. The pawl 4 once retracted returns to the original, projected position in readiness for the subsequently transported, next succeeding pallet.

The above described assembling conveyor system can be combined not only with the parts feeder, but also with one or more of a press, a screw fastening machine, a welding machine and a bonding machine. However, so far as the fabrication of the resin components onto the works is concerned, two alternative methods are possible; to use the assembling conveyor equipped with the parts feeder and to use the assembling conveyor with no parts feeder, but with a separate storage box full of the resin components.

However, as hereinbefore discussed, under the circumstances in which the wage is increasing and automated machinery such as industrial robots is also being introduced, the automation of the above described fabrication requires the system to be essentially equipped with the parts feeder 6 including the alignment device 7, and so is the prior art system devised. The problem with the prior art system is that, since the resin components being many in type have a complicated shape and are hard to be aligned and uniformly positioned, it is nearly impossible to control the position of each of the resin components prior to being fabricated onto the work. Although at present a study is being made to develop an industrial robot having an electronic eye-hand coordination system and, therefore, capable of correcting the position of the resin component after the discrimination of the shape and position of such resin component, it appears that, no matter how complete the robot may be, it would not be able to handle the resin components because most of the resin components are colored in monochrome and have a contour hard to be discriminated. Thus, at present, no one can rely on the robot engineering for the automated fabrication of products.

SUMMARY OF THE INVENTION

Accordingly, the present invention has for its object to eliminate the problems associated with the change in dimension, the operational system, the contamination and size of the molding machine, and the automation of the assembling process, respectively, and to provide an improved apparatus capable of molding molded articles at the site of fabrication and assembling them.

Figure 2:
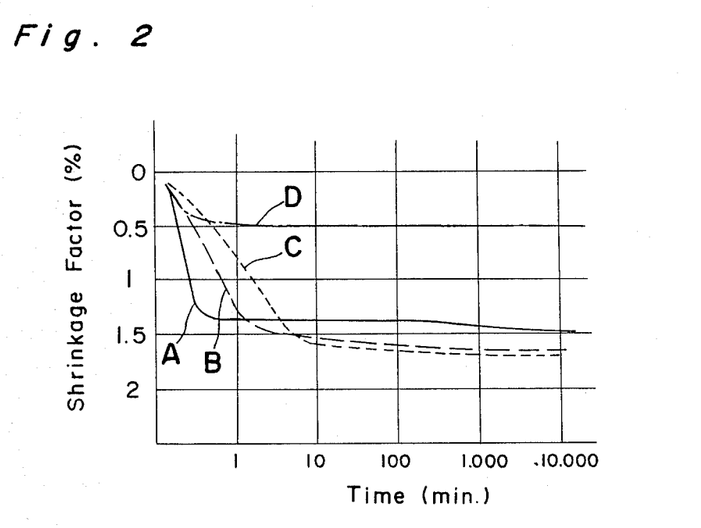
FIG. 2 is a graph showing the change with time in shrinkage factor exhibited by four molded articles.

The present invention has its starting point lying in the skepticism the inventors had about the aging period hitherto considered essential for resin molded articles. FIG. 2 shows the change with time in shrinkage factor of resin molded articles of different wall thickness, the shrinkage factor being expressed in terms of percentage obtained by dividing the dimensions of the mold cavity with the dimensions of the resin molded article and then multiplying the quotient by a factor of 100. The greater the shrinkage factor, the more shrunken the molded article. Specifically, curve A represents the change in shrinkage factor exhibited by a molded article made of polyacetal and having a wall thickness of 2 mm, curve B represents that of a molded article, 4 mm in wall thickness, made of polyacetal and having a shape different from the molded article exhibiting curve A, and curve C represents that of a molded article, 6 mm in wall thickness, made of polyacetal and having the same shape as that of the molded article exhibiting curve B.

As shown in the graph of FIG. 2, and so far as curve A is concerned, the dimensions of the molded article change rapidly during a period of about 30 seconds after the removal from the mold assembly, the rate of shrinkage being subsequently slowed about 30 seconds after the removal from the mold assembly and prior to the passage of 2 to 10 hours. Though the rate of shrinkage appears to be accelerated 2 to 10 hours subsequent to the removal from the mold assembly, the shrinkage appears to be settled down in about one to two days after the removal of the molded article from the mold assembly. It will readily be seen that a great deal of the shrinkage, say, about 86.7%, has taken place during the initial period of about 30 seconds subsequent to the removal from the mold assembly.

Even with curves B and C, it will reaidly be seen that the rate of shrinkage quickly changes a certain time after the removal from the mold assembly, to wit, about 2 minutes and about 5 minutes in case of the molded articles of 4 mm and 6 mm in wall thickness, respectively.

The above described notion can be found equally applicable to any molded articles of any resin material and having any wall thickness. From the experiments conducted, it has been found that the time T at which the rate of shrinkage quickly changes has a certain relationship with the wall thickness t of any molded article as expressed by the following equation:

$$T = kt^2$$

wherein k represents a constant peculiar to the material for the molded article.

When time and wall thickness are expressed in terms of second and millimeter, respectively, the constant k is within the range of 5 to 8 where the material is any one of polyacetal, PBT and polyamide. It is to be noted that the curve D shown in FIG. 2 represents the change with time in shrinkage factor exhibited by a molded article having the same shape as that exhibiting the curve B, but made of ABS resin. The rate of change in shrinkage shown by curve D is very slow, it being, however, that, within about 50 seconds subsequent to the removal of the ABS resin molded article from the mold assembly, about 90% of the total shrinkage has completed. The rate of shrinkage of a molded article made of non-crystalline resin including, for example, ABS resin, is generally higher than that made of crystalline resin including, for example, polyacetal and the constant k peculiar to the non-crystalline resin is within the range of 2 to 6.

Thus, although it is certain that the time required for a molded article to complete the shrinkage is one to two days subsequent to the removal from the mold assembly, it has been found that a great deal of the shrinkage takes place a relatively short time after the removal from the mold assembly.

On the other hand, when it comes to the tolerance in dimension of molded articles to be fabricated, the allowance of 0.2 to 0.5% relative to the absolute dimension is generally permitted and, in the case of a precision instrument such as, for example, a television receiver, a video tape reorder, and a photographic camera, 0.1 to 0.2% is permitted. Even the space between parts is generally permitted about 0.2% relative to the designed dimension. By way of example, assuming that two gear wheels to be meshed with each other, each 200 mm in effective diameter, are manufactured within the regular tolerances of ±0.03 mm, the allowance is 0.15% relative to the absolute dimension, and if these gear wheels are meshed with each other with the center-to-center distance being 20.1±0.03 mm, the allowance of the center-to-center distance is 0.05% when it is minimum and 0.05% on average.

From the foregoing discussion concerning the shrinkage and the design allowance, it will readily be understood that the resin molded article made of, for example, polyacetal relatively highly susceptible to shrinkage, can be actually used for fabrication into a product immediately after the passage of the time during which the rate of shrinkage is relatively high.

The starting point of the present invention lies also in the circumstances in which, with the improvement of the present-day resin processing technology covering the resin material, the molding machine, the mold assembly, and the design of products, the number of the defective molded articles produced has been decreased to such an extent that the quality inspection may be obviated.

According to the present invention, there is provided a combined molding and assembling apparatus which comprises a conveyor means movable from one position to another position spaced apart from such one position, a pallet frictionally engageable with the conveyor means for movement together therewith, a catch mechanism releaseably engageable with the pallet to hold the pallet at a working position, a molding machine fixedly mounted on a bench of the apparatus adjacent the conveyor means and including a movable plate movable in a direction perpendicular to the direction of movement of the conveyor means for selectively closing and opening a mold assembly, and a handling machine including a head capable of moving selectively into and away from the space, in which the mold assembly operates, during the opening of the mold assembly.

With the apparatus according to the present invention, a molded resin component made by the molding machine does not fall by gravity out of the mold assembly in the opened position even if ejected, because one of the mold halves forming the mold assembly is positioned in a direction in which the gravitational force acts. Moreover, since the molded resin component assumes a predetermined position relative to the bench and the work can be transported to the working site adjacent the molding machine, the fabrication of the resin component onto the work can readily be performed.

The above described apparatus according to the present invention may have one or all of the following arrangements combined therewith:

(I) A handling machine including a head capable of moving to a position required to cover, within the reach thereof, the pallet on the conveyor held at the working position by the catch mechanism.

With the combined use of the handling machine, it is possible to cause the molded articles to be automatically mounted one at a time on the work then fixedly placed on the pallet.

(II) A stock device for temporarily storing molded articles. This stock device may comprise a plurality of trays, stations in a number greater than that of the trays by at least one, and a drive mechanism for moving any one of the trays sequentially from one of the stations to another, at least one of the stations being covered within the reach of the head of the handling machine.

Where the stock device is employed, the molded articles having respective sprue runners and/or the resin components can be temporarily stored and, therefore, the production is possible without lowering the efficiency of the machine in the event that, because of the relatively great wall thickness the articles and/or components, they cannot be immediately used for the fabrication onto the work. Moreover, since it can be operated while the station to which the handling machine transfers the molded article is fixed, the handling machine can easily be controlled.

Furthermore, it is possible to discern the first molded, oldest one from the molded resin components placed on the stock device and, therefore, the fabrication by either an attendant worker or the handling device can be facilitated.

The stock device of the above described construction may be provided with a gate cutting station. In addition, where two of the stations of the stock device are arranged within the reach of the head of the handling device, the operation to transfer the molded article to the stock device and the operation to remove the resin component from the stock device can be carried out very efficiently.

Alternatively, the stock device may comprise a plurality of stations for storing at least one fixed molded article, all of these stations being covered within the reach of the head of the handling machine, and a control unit for memorizing the absence or presence of molded articles at the stations and also the order of the molded articles successively molded, so that the first molded one of the molded articles can be selected. According to this alternative construction, the molded article can be temporarily stored for a substantial time.

(III) Means for detecting the entry of the pallet onto the conveyor means and generating a signal upon the entry of the pallet onto the conveyor means, and a control means operable in response to the signal for drrving the molding machine on a predetermined signal processing scheme.

Where the detecting means is employed, the molding machine can be refrained from making the molded articles purposelessly and can be rendered to automatically make the molded articles in a quantity corresponding to the number of the works supplied onto the apparatus.

BRIEF DESCRIPTION OF THE DRAWINGS

These and other objects and features of the present invention will become clear from the subsequent description taken in conjunction with preferred embodiments thereof with reference to the accompanying drawings, in which.

DETAILED DESCRIPTION OF THE EMBODIMENTS

Figure 3:
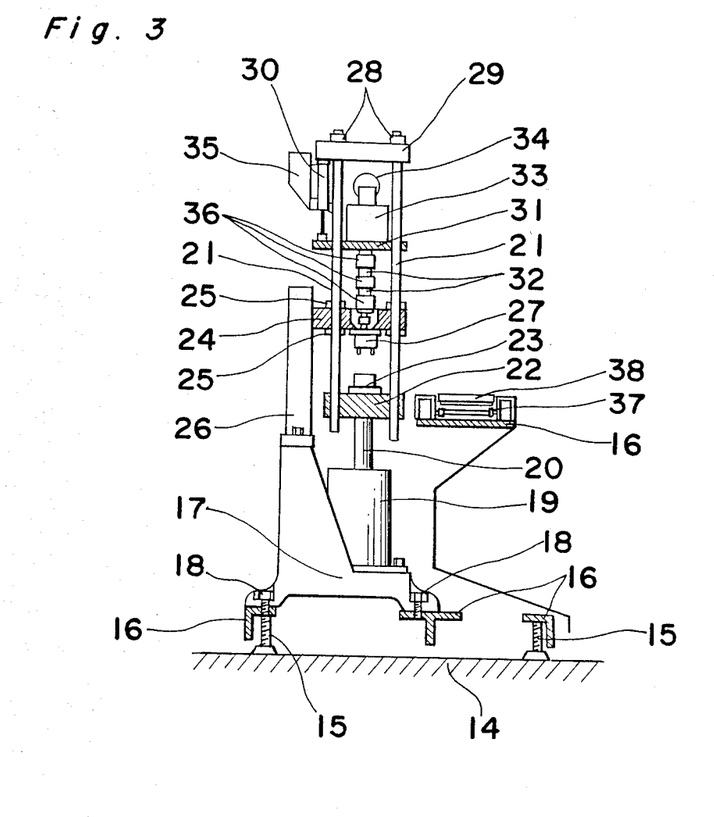
FIG. 3 is an end view, with a portion cut away, of a molding and assembling apparatus according to one preferred embodiment of the present invention.

Referring to FIG. 3 illustrating, with a portion cut away, a combined molding and assembling apparatus according to one preferred embodiment of the present invention, a molding machine is fixedly mounted with its base 17 resting on and fixed by means of set bolts 18 to a bench including a skeleton structure 16, the skeleton structure 16 having portions resting on the floor or ground surface 14 within a factory by means of an equal number of jacks or levelling blocks 15. The base 17 of the molding machine has a mold clamping cylinder 19 fixedly mounted thereon, said mold clamping cylinder 19 having a vertically movable piston rod 20 extending upwardly therefrom. Tie bars 21 are rigidly connected at one end to the base 17 and extend upwardly therefrom, the opposite ends of said tie bars 21 having an end plate 29 secured thereto by means of fastening nuts 28. Slidable along the tie bars 21 and mounted on the piston rod 28 for movement together therewith is a movable plate 22 having a lower mold 23 fixedly mounted thereon. Although not shown, the piston rod 20 is provided with any suitable ejecting means. A fixed plate 24 is secured to the tie bars 21 by means of fastening nuts 25 mounted on the tie bars 21 on respective sides of the fixed plate 24 and is spaced in face-to-face relation to the movable plate 22. This fixed plate 24 so mounted on the tie bars 21 is backed up by a back-up frame or plate 26 having its opposite ends rigidly secured to the fixed plate 24 and the base 17, respectively. An upper mold 27 cooperable with the lower mold 23 to form a molded article is secured to the undersurface of the fixed plate 24 confronting the lower mold 23. The end plate 29 supports a support plate 31 positioned therebelow for movement along the tie bars 21 and is operatively coupled therewith by means of a pneumatic cylinder 30. The support plate 31 carries an injection cylinder 32, an injection boosting cylinder 33, a drive motor 34 for driving a screw feeder (not shown) within the injection cylinder 32, and a hopper 35 for accommodating a quantity of molding material and successively supplying the molding material therefrom onto the injection cylinder 32. The injection cylinder 32 is provided with heaters 36 for heating the molding material supplied into the injection cylinder 32.

While the molding machine including the base 17 and all that are mounted on the base 17 is constructed as hereinabove described, a portion of the skeleton structure 16 is provided with a chain conveyor 37 having a pallet 38 mounted thereon in frictional engagement therewith for movement together with the chain conveyor 37.

In the construction described above with reference to FIG. 3, the synthetic molding material contained in the hopper 35 falls therefrom by gravity into the injection cylinder 32. The molding material so supplied into the injection cylinder 32 is fused by the heaters 36 while plasticized by the rotation of the screw feeder built in the injection cylinder 32. The injection cylinder 32 can be driven by the pneumatic cylinder 30 in a direction close to and away from the upper mold 27 and is, when the molding material within the injection cylinder 32 is to be extruded therefrom into the mold assembly, brought into abutment with the upper mold 27. Upon the abutment of the injection cylinder 32 with the upper mold 27, the molding material within the injection cylinder 32 is extruded by the action of the boosting cylinder 33 into a sprue hole (not shown), defined in the upper mold assembly constituted by the lower and upper molds 23 and 27. The actual extrusion of the molding material from the injection cylinder into the interior of the mold assembly takes place immediately after the lower mold 23 movable together with the piston rod 20 in a direction close to and away from the upper mold 27 is clamped together with the upper mold 27 by the action of the pneumatically operated, mold clamping cylinder 19. The clamping force exerted by the mold clamping cylinder 19 with which the lower and upper molds 23 and 27 are firmly clamped together is of a value sufficient for the mold assembly as a whole to withstand the pressure of the molding material being injected thereinto.

The molding material within the mold assembly is solidified by heat exchange with the mold assembly and, after a predetermined time, the mold clamping cylinder 19 is operated so as to retract the piston rod 20 with the lower mold 23 consequently separated away from the upper mold 27, whereupon the molded article including a resin component can be ejected from the lower mold 23 by the ejecting means (not shown). An attendant worker occupying the position on one side of the conveyor 37 remote from the molding machine can reach a mold working zone, in which the lower mold 23 is moved relative to the upper mold 27, through a safety hood (not shown) to pick the molded article up from the molding machine. After a certain period of time during which a gate cutting may be effected to the molded article and/or the molded article may be allowed to stand for aging if so required, the molded article is fabricated onto the work which has been, after having been placed on the pallet 38, transported by the conveyor to an assembling zone at which the pallet 38 with the work thereon is halted by a catch mechanism (not shown) having an engagement pawl retractably movable into the space, in which the pallet 38 is transported, for engagement with the pallet 38 arriving at the assembling zone.

The molding machine of the construction described above is preferably so sized in the light of the reach of the attendant worker, the psychological pressure the molding machine may give to the attendant worker, the structure of the bench, and other factors that the clamping force exerted thereby is 20 tons or less.

According to the construction shown in and described with reference to FIG. 3, the following advantages can be appreciated.

(1-a) Immediately after the molding of a resin component, the latter can readily be fabricated onto the work to which it is to be connected or mounted.

(1-b) The molded article including the resin component will not fall out of the lower mold and rests in the form as received in the lower mold during the ejection thereof, thereby facilitating the work to be done by the attendant worker.

(1-c) Since both of the motor drive system and the pneumatic drive system are employed, the molding machine is free from contamination with oil.

Figure 4:
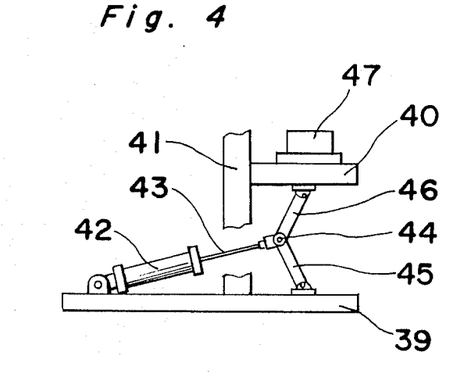
FIGS. 4 and 5 illustrate different modifications of the mold clamping mechanism used in the apparatus of the present invention.
Figure 5:
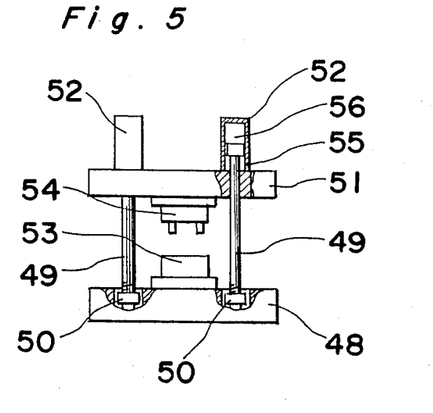

Although the molding machine shown in FIG. 3 has been described as fixedly mounted on a lower portion of the bench, a mold clamping mechanism shown in each of FIGS. 4 and 5 is so designed as to permit the molding machine to be mounted on an upper portion of the bench in a manner similar to a parts feeder, a screw fastening machine, and a welding/bonding machine.

Referring first to FIG. 4, reference numeral 39 represents a base fixedly mounted on the bench, reference numeral 40 represents a movable plate carrying a lower mold 47 mounted thereon, and reference numeral 41 represents a plate secured to the base 39 so as to extend upwardly therefrom for supporting a fixed plate and an injecting means, both not shown, said plate 41 including a guide mechanism for guiding the movable plate 40 for sliding movement in a direction close to and away from an upper mold. Reference numeral 42 represents a cylinder pivotally mounted on the base 39 and having a piston rod 43, and reference numerals 45 and 46 represent respective toggle arms connected pivotally at one end to the base 39 and the movable plate 40 and at the other end together by means of a toggle joint 44 which is in turn pivotally coupled with the piston rod 43. The movement of the lower mold 47 in a direction close to and away from the upper mold can be effected by projecting and retracting the piston rod 43 of the cylinder 42.

The arrangement shown in FIG. 4 is advantageous in that, since the height of a mold clamping unit other than the stroke of movement of the movable plate 40 is relatively small, the overall height of the molding machine can be reduced and that, since no tie bar is necessary while all of the guide mechanism for the movable plate, the fixed plate and the injecting means are supported by the plate 41, both the removable of the molded article and the replacement of the mold assembly can readily be performed.

Referring to FIG. 5, reference numeral 48 represents a fixed plate which concurrently serves as a base adapted to be fixedly mounted on the bench, reference number 49 represents tie bars secured to the fixed plate 48 by means of nuts 50, reference numeral 51 represents a movable plate slidable along the tie bars 49 and having an injecting means (not shown) mounted thereon, and reference numeral 52 represents cylinders rigidly mounted on the movable plate and utilizing the tie bars 49 as their piston rods. Lower and upper molds 53 and 54 are secured to the fixed plate 48 and the movable plate 51 in face-to-face relation to each other, respectively.

In the construction shown in and described with reference to FIG. 5, when the pressure in a confined space 55 in each of the cylinders 52 decreases, the movable plate 51 is moved in a direction required to close the lower and upper molds 53 and 54 together, but when it increases, the movable plate 51 is moved in the opposite direction to separate the molds 53 and 54 away from each other. The arrangement shown in and described with reference to FIG. 5 is advantageous in that not only can the length from the lower mold 53 down to the base surface of the bench be minimized, but also the molded article can readily be removed out of the molding machine since the lower mold is immovable.

Figure 6:
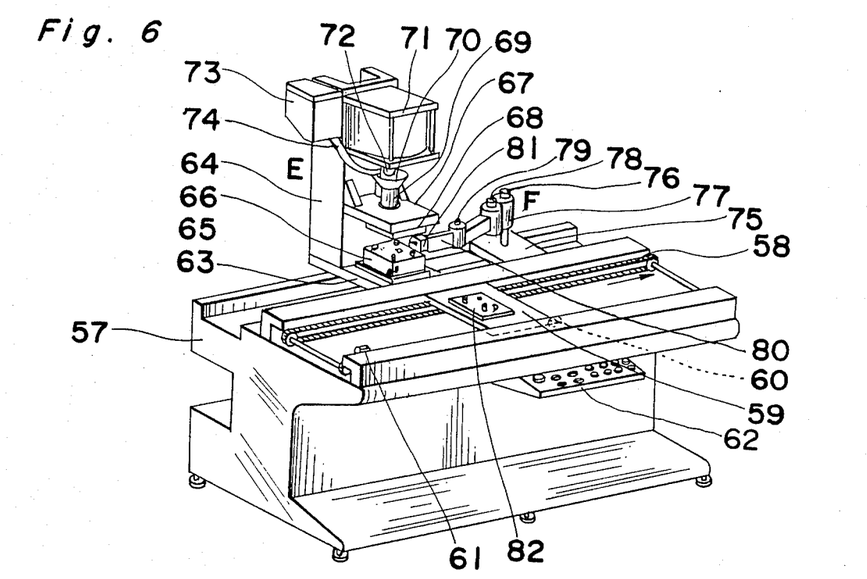
FIG. 6 is a perspective view of the apparatus according to another preferred embodiment of the present invention.

FIG. 6 illustrates the apparatus according to another preferred embodiment of the present invention. The apparatus shown therein has a basic structure in which a molding machine E and a handling machine F are combined with and mounted on the bench of the conventional in-line production conveyor system shown in FIG. 1. As shown, a bench 57 is provided with a conveyor 58 moving from one end to the opposite end of the bench 57, a pallet 59 movable on the conveyor 58 in a direction as indicated by the arrow and slidable together with the conveyor 58 by an appropriate frictional engagement therewith, a catch mechanism having a pawl 60 retractably movable into the space in which the pallet 59 is transported, a limit switch 61 for detecting the entry of the pallet 59, and a control box 62 for manually controlling the sequential operation of both the molding machine E and the handling machine F.

The molding machine E includes a base 63 rigidly mounted on the bench 57, a plate 64 rigidly mounted on the base 63 so as to extend upwardly therefrom, a movable plate 65 adapted to be driven by the mechanism shown in FIG. 4 for sliding movement along the plate 64 and having a lower mold 66 mounted thereon, a fixed plate 67 secured to the plate 64 and having an upper mold 68 carried thereby in face-to-face relation with the lower mold 66, an injection cylinder 69 mounted on the fixed plate 67, a hopper 70 supported by the plate 64 and positioned above the injection cylinder 69, an injection boosting cylinder 71 supported by the plate 64 at a position above the hopper 70 and having band heaters, a plunger head 72 adapted to be driven by the boosting cylinder 71 into the injection cylinder, a material storage tank 73 carried by the plate 64 and capable of discharging in a predetermined quantity the material which is accommodated therein, and a supply conduit 74 communicating between the tank 73 and the hopper 70.

The handling machine F includes a mounting base 75, a pole 76 rigidly mounted on the mounting base 75 so as to extend upwardly therefrom, a main body 77 mounted on the pole 76 for sliding movement in a direction axially of the pole 76, a first arm 78 pivotable together with the main body 77 in a horizontal plane perpendicular to the pole 76, a second arm 80 articulated to the first arm 78 by means of a hinge joint 79 and pivotable in the horizontal plane perpendicular to the pole 76 independently of the first arm 78, and a head 81 secured to one end of the second arm 80 remote from the first arm 78. The first and second arms 78 and 80 are so sized and so supported as to permit the head 81 to move in a range covering the mold assembly of the molding machine, and the work 82 on the pallet 59 then halted at a definite position by the catch mechanism 60.

The movable plate 65 having the lower mold 66 is, when and so long as the head 81 of the handling machine is detected as not moved to a space in which the lower mold 66 is moved, driven to move in a direction close to and away from the fixed plate 67 to effect the closure and separation of the lower mold 66 relative to the upper mold 68, respectively. The handling machine is so electrically designed that, when and so long as the mold assembly of the molding machine is detected as opened, the head 81 can be moved into the space in which the lower mold 66 is moved.

In the construction described hereinabove, when the limit switch 61 is actuated in contact with the pallet 59 detecting that the pallet 59 has entered above the bench, the movable plate 65 is upwardly driven to close the lower mold 66 against the upper mold 68. The injection cylinder having been heated by the heaters contains therein a resin material in melted state, which resin material has been supplied thereinto from the hopper. After the closure of the mold assembly and after the clamping force has been applied to the mold assembly by means of a toggle mechanism (see FIG. 4), the boosting cylinder 71 is operated to project the plunger head 72 into the interior of the injection cylinder 69 for extruding the resin material within the injection cylinder 69 into the mold assembly. After the solidification of the resin material extruded into the mold assembly, the movable plate is lowered to separate the lower mold 66 away from the upper mold 68. Then, the molded resin component is removed from the mold assembly by a mechanical ejecting means normally utilized in conventional molding technology, subsequently resting on an ejector pin. The head 81 of the handling machine, after the lower mold 66 has been confirmed as separated away from the upper mold 68, then enters the space in which the lower mold 66 moves, whereupon the main body 77 carrying the head 81 through the articulately connected first and second arms 78 and 80 is lowered along the pole 76 to bring a chuck hand, provided on the head 81, to a position ready to grip the molded resin component. The molded resin component is gripped by the chuck hand when the latter is closed. Thereafter, the main body 77 is lifted along the pole 76 to the initial position and the head 81 is subsequently swung away from the space in which the lower mold 66 moves. Should the limit switch 61 have detected the entry of the next succeeding pallet by the time the head 81 swings away from the above described space, the molding machine starts the next succeeding cycle of molding operation accompanied by the closure of the mold assembly. If this is not the case, i.e., if the limit switch 61 does not detect the entry of the next succeeding pallet, the molding machine remains without starting the next succeeding cycle of molding operation.

The handling machine having the resin component gripped by the chuck hand, after having detected that the pallet 59 is engaged with the pawl of the catch mechanism, causes the head 81 to move to a position above the pallet 59 and then to a predetermined position immediately above that portion of the work where the resin component should be mounted. The actual mounting of the resin component onto the work placed on the pallet 59 takes place when the main body 77 is again lowered along the pole 76, opening the chuck hand to leave the resin component on the work. After the release of the resin component, the main body is again lifted to an original height with the head guided to a neutral zone defined intermediately between the molding machine and the pallet 59. The catch mechanism, after having detected the return of the handling machine to the neutral zone, causes the pawl 60 to retract so as to disengage from the pallet 59, thereby permitting the pallet 59 to be further transported.

According to the embodiment shown in and described with reference to FIG. 6, the following advantages can be appreciated.

(2-a) Both the molding and the fabrication of the resin component are possible with no need of any attendant worker.

(2-b) The molding of a resin component can be carried out in a number of cycles equal to the number of the works which are transported by the conveyor system, and just very irregularly.

Figure 7:
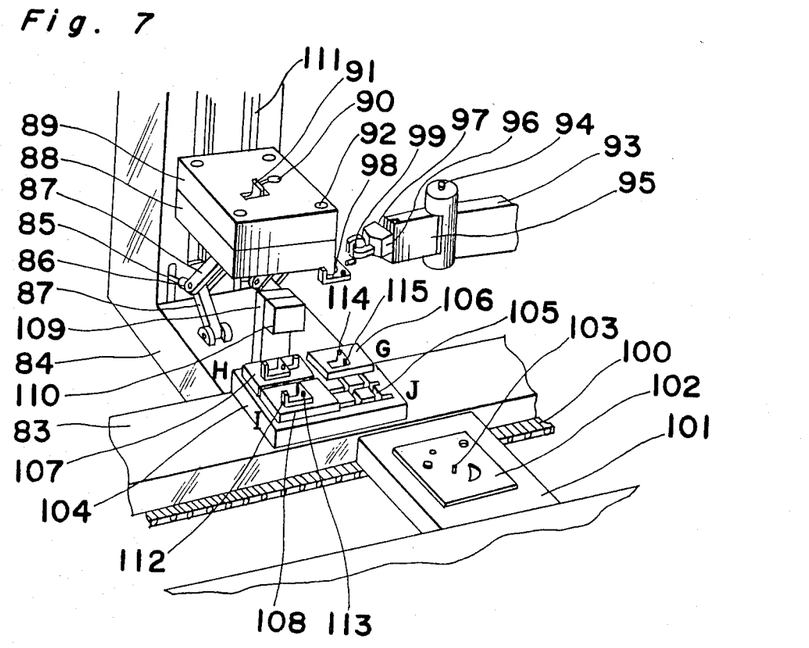
FIG. 7 is a view similar to FIG. 6, showing an essential portion of the apparatus according to a further embodiment of the present invention.

The apparatus shown in FIG. 7 is a modified version of the apparatus of FIG. 6, in which a stock device including a runner cutter is added.

Referring now to FIG. 7, reference numeral 83 represents a bench, reference numeral 84 represents a base of the molding machine comprising a mold clamping cylinder having a piston rod 85, and reference numeral 87 represent toggle arms pivotally connected at one end to the base 84 and a movable plate 88 and at the other end together by means of a toggle joint 81 which is in turn pivotally connected with the piston rod 85. Reference numeral 89 represents a lower mold rigidly mounted on the movable plate 88 and having defined therein a runner groove 90, a mold cavity 91, and a plurality of holes 92 for guide bushings engageable with corresponding guide posts secured to an upper mold. Reference numeral 111 represents a pair of parallel guide grooves for guiding the movable plate 88.

The handling machine includes first and second arms 93 and 95 articulately connected together by means of a hinge joint 94, the hinge joint 94 having an actuator built therein for adjustably swinging the second arm 95 in a horizontal plane relative to the first arm 93. One end of the second arm 95 opposite to the hinge joint 94 is provided with a head 96 which is in turn provided with a closeable chuck hand 97, the angle of said head 96 being adjustable in a vertical direction parallel to the direction of movement of the movable plate 88. Reference numeral 98 represents a molded resin component which is a replica of the shape of the mold cavity, but has a sprue runner 99 integral therewith and extending outwardly therefrom.

Reference numeral 100 represent a portion of the chain conveyor by which a pallet 102 having positioning pins 103 for engagement with the resin component is transported.

The stock device mounted on the bench 83 comprises a drive unit 104 having four stations G, H, I and J, three trays 106, 107 and 108 each mounted on the drive unit 104 for movement from one station to another along guide grooves 105 and having a recess 114 and a pin 115 both so sized and so contoured as to receive the respective resin component 98, a gate cutter support 109 carried by the drive unit 104 and having a tunnel defined therein for the discharge of sprue runners cut successively from the resin components, and a gate cutter head 110 supported by the gate cutter support 109 for movement up and down along such support 109 and including a gate cutter for separating the runner 99 from the resin component 98 then held at the station H and also a chuck for holding the sprue runner. It is to be noted that only two of the stations, that is, stations G and J, of the drive unit 104 are so positioned as to be covered within the reach of the head 96 of the handling machine.

With the apparatus according to the embodiment shown in and described with reference to FIG. 7, the resin component 98 having the sprue runner 99 can, immediately after having been removed from the molding machine, be allowed to stand on the tray 106. Subsequently, the tray 108 is moved from station I onto station J, the tray 108 supporting thereon the resin component which has been separated from the runner cut off by the gate cutter. When the arrival of the tray 108 at station J is detected, the head 96 of the handling machine is moved from a position aligned with station G to another position aligned with station J at which the tray 108 has been held, and, thereafter, the chuck hand 97 grips a boss 113 of the resin component 112 for the transportation of the resin component 112 towards the work 102. As soon as the resin component 112 is so transported, it is released from the head 96 onto the work 102 whereupon the resin component 112 is mounted on the work 102 in the form with the positioning pin 103 inserted through the boss 113. After the tray 108 has been moved from station I to station J, the tray 107 is moved from station H to station I on the one hand and the tray 106 which has just received the resin component having the sprue runner is moved from station G to station H on the other hand. The resin component with the sprue runner which has been transferred to station H together with the tray 106 is cut by the gate cutter head 110 to remove the sprue runner 99 from the resin component 98, the removed sprue runner 99 being subsequently gripped by the gate cutter head 110 and then discharged to the outside through the tunnel in the cutter support 109.

The apparatus according to the embodiment shown in and described with reference to FIG. 7 has the following advantages.

(3-a) Even if the molded resin component is allowed to stand for aging purpose for a period of time three times longer than the time required to complete one cycle of molding operation, the continued molding operation performed by the molding machine will not be hampered.

(3-b) The molded resin components can be automatically stocked without both the order and the position thereof being disorganized.

(3-c) The gate cutting is automatically performed without adversely affecting the operating cycle of each of the molding machine and the handling machine.

If all of the stations of the stock device of the construction described above are so designed as to be covered within the reach of the head of the handling machine, and, at the same time, if a control unit of the handling machine is so designed as to memorize the presence or absence of the resin components at the stations and also memorize the order of the resin components having been successively molded so that the resin components can be utilized for the fabrication onto the work in the order from the first molded one to the last molded one, the drive unit for the trays including the guide grooves 105 can be omitted and a great deal of latitude can be given to the arrangement of the stations.

Moreover, if at least one of the stations of the stock device is arranged within the reach of the head of the handling machine, it will be possible to pick up the molded article from the molding machine and the attendant worker assigned to do a job of picking up the resin component from the stock device onto the work for fabrication there, if he or she is familiar with the behavior of the trays in the stock device, can readily recognize at one glance which one of all of the resin components present in the stock device is the first molded resin component. Where this discrimination is desired to be performed by another handling machine, this can readily be accomplished by arranging station J and the position, where the pallet carrying the work thereon, so as to be covered within the reach of such another handling machine.

Where the apparatus according to the present invention employs a single molding machine and a single handling machine and, yet, the mold assembly used in such a single molding machine has a capability of molding a resin component at a time, the time required for the apparatus as a whole to complete one cycle of operation is determined by the longest time of all of the time required for each pallet, being transported by the conveyor system, to travel to the position where the preceding pallet has occupied, the time required for the molding machine to complete one cycle of molding operation, the time required for the handling machine to complete one cycle of operation, and the time required for the stock device to complete one cycle of operation. Therefore, prior to the passage of the time required for the apparatus to complete each cycle of operation, the mold assembly is held in position with the lower and upper molds separated away from each other upon the completion of one operating cycle of the molding machine, the head is held in the neutral zone upon the completion of the operating cycle of the handling machine, the stock device is, upon the completion of its operating cycle, in such a condition that no tray is present at station J and the tray present at station G is empty, and the pallet is halted by the catch mechanism.

The number of the stations employable in the stock device fundamentally depends on a combination of the time required for the apparatus as a whole to complete each cycle of operation and the time required for the aging defined by the previously mentioned equation, that is, $T=kt^2$, wherein T represents the aging time, k represents a constant peculiar to the material for the resin component, and t represents the wall thickness of the resin component. In general, it often occurs that the apparatus according to the present invention is lined up with other identical apparatuses to make a production line and, in such case, the time required for one apparatus to complete each cycle of operation has to be rendered uniform throughout all of the apparatuses forming the production line. In this case, the aging time is influential. Since the aging time depends on the greatest one of the wall thicknesses of portions of a given resin component which are considered important in terms of the design dimension, the greater the wall thickness, the greater the number of the stations employed.

From the foregoing description of the various preferred embodiments, the present invention will readily be understood as having the following capabilities.

(a) Since the molding machine is mounted on and integrated with the conveyor system, the molded articles can readily be supplied successively onto the assembly line with no special layout required to be designed.

(b) A plurality of the apparatus can be lined up to provide a thorough assembly line and, therefore, it is possible to supply a plurality of resin components onto a single work successively.

(c) Since the molding of the resin components is carried out at a location in the vicinity of the work, the temporary stock of the resin components can be minimized.

(d) Since it is possible to manufacture the resin components in a quantity determined by the number of the works produced, the possibility of the resin components being excessively manufactured can be avoided, thereby maximizing the economy of production of products.

Although the present invention has fully been described in connection with the preferred embodiments thereof with reference to the accompanying drawings, it is to be noted that various changes and modifications are apparent to those skilled in the art. Such changes and modifications, unless they depart from the scope of the present invention as defined by the appended claims, are to be understood as included therein.

What is claimed is:

1. A combined molding and assembling apparatus which comprises a conveyor means movable from one position to another position spaced apart from such one position, a pallet frictionally engageable with the conveyor means for movement together therewith, a catch mechanism releaseably engageable with the pallet to hold the pallet at a working position, a molding machine fixedly mounted on a bench of the apparatus adjacent the conveyor means and including a movable plate movable in a direction perpendicular to the direction of movement of the conveyor means for selectively closing and opening a mold assembly, and a handling machine including a head capable of moving selectively into and away from the space, in which the mold assembly operates, during the opening of the mold assembly.

2. An apparatus as claimed in claim 1, wherein the head of the handling machine is movable so as to cover the pallet at the working position within the reach thereof.

3. An apparatus as claimed in claim 1, further comprising a stock device including a plurality of trays, stations in a number greater than that of the trays by at least one, and a drive mechanism for moving any one of the trays from one of the stations to another, at least one of said stations being covered within the reach of the head of the handling machine.

4. An apparatus as claimed in claim 2, further comprising a stock device including a plurality of trays, stations in a number greater than that of the trays by at least one, and a drive mechanism for moving any one of the trays from one of the stations to another, at least two of the stations being covered within the reach of the head of the handling machine.

5. An apparatus as claimed in claim 2, further comprising a stock device including a plurality of stations for storing at least one fixed molded article, said stock device being so positioned as to permit all of the stations to be covered within the reach of the head of the handling machine, said handling machine having a control unit for memorizing the absence or presence of molded articles at the stations and also the order of the molded articles successively molded, so that the first molded one of the molded articles can be selected.

6. An apparatus as claimed in claim 1, further comprising means for detecting the entry of the pallet onto the conveyor means and generating a signal upon the entry of the pallet onto the conveyor means, and a control means operable in response to the signal for driving the molding machine on a predetermined signal processing scheme.

* * * * *